(12) United States Patent  
Ogino

(10) Patent No.: US 6,621,628 B1
(45) Date of Patent: Sep. 16, 2003

(54) LASER MICROSCOPE AND CONFOCAL LASER SCANNING MICROSCOPE

(75) Inventor: Katsumi Ogino, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/856,575

(22) PCT Filed: Oct. 12, 2000

(86) PCT No.: PCT/JP00/07090

§ 371 (c)(1),
(2), (4) Date: May 23, 2001

(87) PCT Pub. No.: WO01/27680

PCT Pub. Date: Apr. 19, 2001

(30) Foreign Application Priority Data

Oct. 12, 1999 (JP) ............................................ 11-288979

(51) Int. Cl.[7] .............................................. G02B 21/06
(52) U.S. Cl. ..................... 359/385; 359/388; 250/201.1
(58) Field of Search ................................. 359/385, 368, 359/369, 370, 371, 386, 387, 388; 250/201.3, 201.1, 458.1, 459.1, 461.1

(56) References Cited

U.S. PATENT DOCUMENTS 4,721,850 A * 1/1988 Sakai et al. ............... 250/201.1
5,260,569 A * 11/1993 Kimura ...................... 250/234
6,400,502 B1 * 6/2002 Ooki ........................... 359/369

FOREIGN PATENT DOCUMENTS

| JP | 4-304411 A | 10/1992 |
| JP | 9-189864 A | 7/1997 |
| JP | 9-304701 A | 11/1997 |
| JP | 10-186241 A | 7/1998 |
| JP | 10-286234 A | 10/1998 |
| JP | 2000-66107 A | 3/2000 |
| JP | 2000-66108 A | 3/2000 |
| JP | 2000-66109 A | 3/2000 |
| JP | 2000-66110 A | 3/2000 |

* cited by examiner

Primary Examiner—Mark A. Robinson
Assistant Examiner—Lee Fineman
(74) Attorney, Agent, or Firm—Oliff & Berridge, PLC

(57) ABSTRACT

A laser microscope includes: a light source that emits deep ultraviolet laser light to be irradiated on a sample; a limiting device that sets a limit to an intensity of the deep ultraviolet laser light irradiated on the sample; a detection device that detects the deep ultraviolet laser light having been reflected from the sample; a storage device that stores first information related to damage to the sample corresponding to the intensity of the deep ultraviolet laser light; and a control device that controls the limiting device based upon the first information when a sample damage limit is input from outside.

7 Claims, 4 Drawing Sheets

LASER MICROSCOPE AND CONFOCAL LASER SCANNING MICROSCOPE

The disclosure of Japanese Patent Application No. H11-288979 filed Oct. 12, 1999 is herein incorporated by reference.

1. Technical Field

The present invention relates to a laser microscope and a confocal laser scanning microscope.

2. Background Art

The limits to the resolving power of a microscope employed to observe an ultra-fine structure is normally expressed as $\delta=\lambda/2NA$ with $\delta$ representing the resolving power, $\lambda$ representing the operating wavelength and NA representing the numerical aperture at the objective lens. This expression indicates that the resolving power $\delta$ maybe improved by reducing the operating wavelength $\lambda$, by increasing the numerical aperture NA at the objective lens or by both reducing the operating wavelength $\lambda$ and increasing the numerical aperture NA of the objective lens at the same time.

When observing a bio-sample (bio-specimen) such as a cell, the resolving power is improved by utilizing an immersion objective lens, since if the operating wavelength was reduced to a value at or lower than the ultraviolet range (equal to or lower than 300 nm), the sample itself would become damaged due to a photochemical reaction or the like occurring in the sample.

If, the other hand, the sample is mainly constituted of an inorganic material and, in particular, when observing an integrated circuit, the sample is not subject to extensive damage and, thus, the resolving power is improved by reducing the operating wavelength unlike when observing a bio-sample.

Under normal circumstances, the use of immersion objective lenses is not desirable since oil would adhere to the sample to result in oxidation of metal wirings thereby inducing problems such as shorting of the integrated circuit.

However, the reduction in the operating wavelength would complicate the structure and the operation of a microscope system that operates in the wavelength range of X rays or electron beams, which is bound to compromise the ease of use and, therefore, there is a limit to the degree to which the operating wavelength can be reduced.

Miniaturization of all ultra-fine structures, a typical example of which is an integrated circuit such as an IC, has been vigorously pursued in recent years in the field of semiconductors. In the case of an ultra-fine cyclical structure ("line and space" is terminology normally used in the semiconductor process technology), it becomes logically difficult to resolve a cyclical structure in the sample with its repetitive cycle smaller than 0.25 $\mu$m with good contrast on a conventional optical microscope.

However, a resolving power of 0.10 $\mu$m is achieved by using a deep ultraviolet continuous oscillation laser as a light source and using an objective lens with a large numerical aperture of approximately 0.9. Deep ultraviolet continuous oscillation lasers include a laser that continuously oscillates light with a wavelength of 266 nm which is a quadruple harmonic of Nd:YAG laser by using a BBO crystal While an inorganic sample is not subject to extensive damage to the sample caused by deep ultraviolet light compared to a bio-sample, some damage still does occur to such an inorganic sample. For instance, if the sample is a resist pattern on a semiconductor wafer, the wavelength of light used to expose the resist during the manufacturing process is close to the wavelength of light irradiated on the sample during an observation and the total exposure quantity is large, the sample becomes damaged.

In particular, the use of a confocal laser scanning microscope poses a problem in that since the laser light converges within a very small range at the surface of the sample to result in a high level of energy received at the sample per unit area, the degree of damage increases compared to that associated with one shot illumination (Kohler illumination).

DISCLOSURE OF THE INVENTION

An object of the present invention is to provide a laser microscope and a confocal laser scanning microscope that minimize damage to a sample caused by deep ultraviolet light.

In order to attain the above object, a laser microscope according to the present invention comprises: a light source that emits deep ultraviolet laser light to be irradiated on a sample; a limiting device that sets a limit to an intensity of the deep ultraviolet laser light irradiated on the sample; a detection device that detects the deep ultraviolet laser light having been reflected from the sample; a storage device that stores first information related to damage to the sample corresponding to the intensity of the deep ultraviolet laser light; and a control device that controls the limiting device based upon the first information when a sample damage limit is input from outside.

A confocal laser scanning microscope according to the present invention comprises: a light source that emits deep ultraviolet laser light to be irradiated on a sample; a limiting device that sets a limit to an intensity of the deep ultraviolet laser light irradiated on the sample; a detection device that detects the deep ultraviolet laser light having been reflected from the sample; a pinhole device provided frontward relative to the detection device and having a pinhole for limiting the reflected light; a storage device that stores first information related to damage to the sample corresponding to the intensity of the deep ultraviolet laser light; and a control device that controls the limiting device based upon the first information when sample damage limit is input from outside.

In this confocal laser scanning microscope, it is preferred that the pinhole device controls a pinhole size when a pinhole adjustment signal is input from outside.

THE BEST MODE FOR CARRYING OUT THE INVENTION

The following is an explanation of the embodiments of the invention, given in reference to the drawings.

Figure 1:
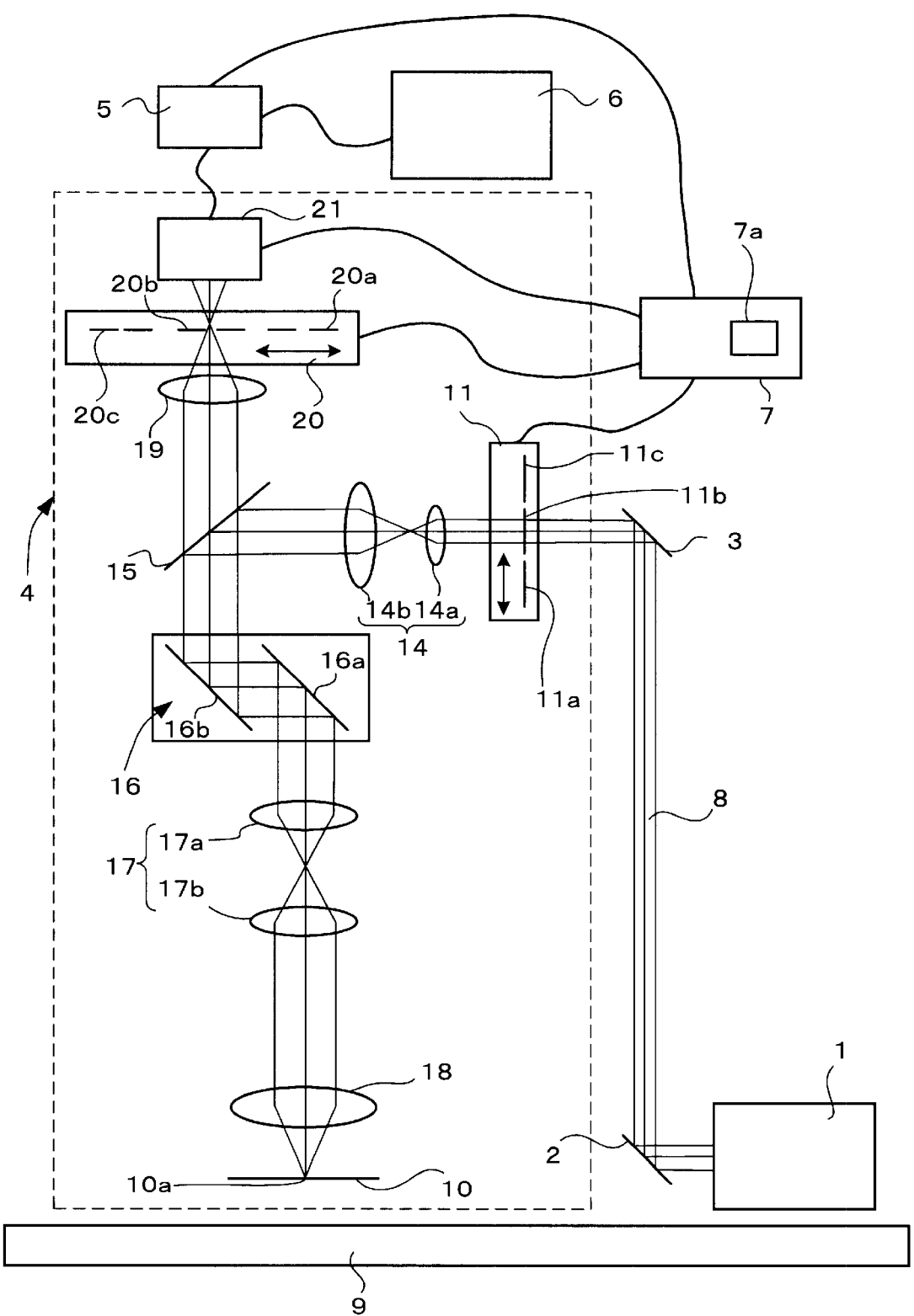
FIG. 1 is a block diagram of the confocal laser scanning microscope achieved in a first embodiment of the present invention.
Figure 2:
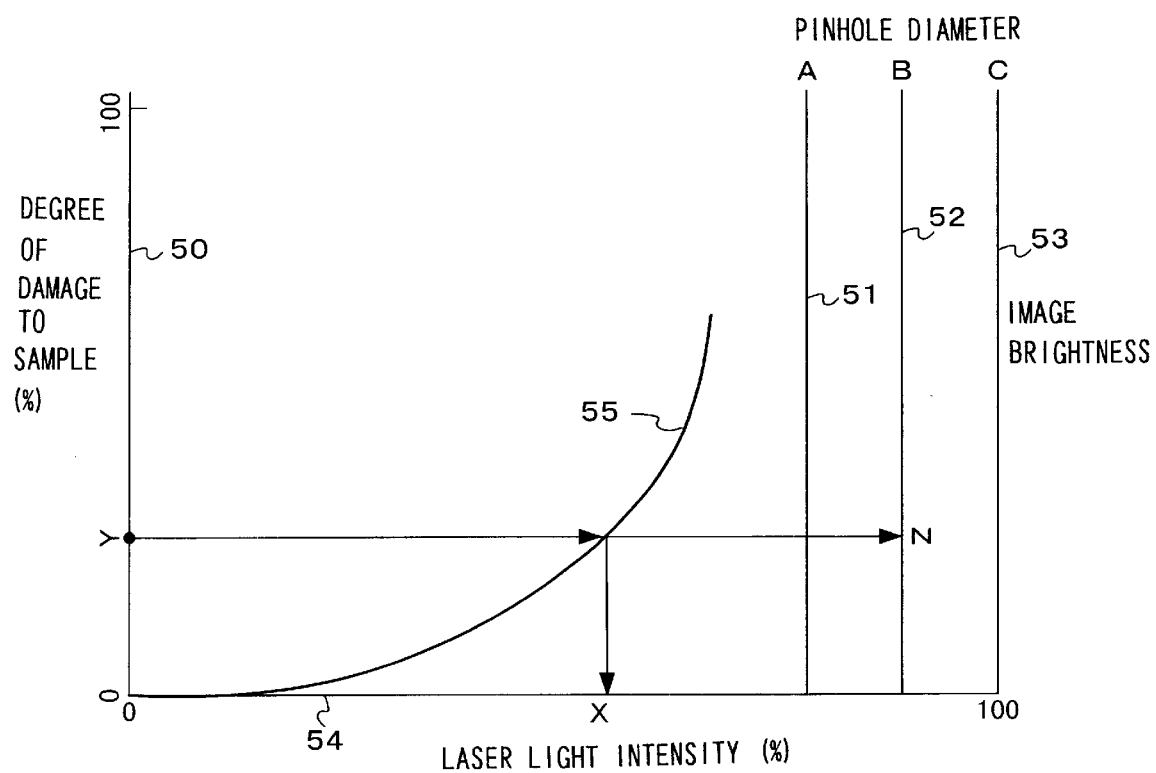
FIG. 2 presents an example of a map.

FIG. 1 is a block diagram of the confocal laser scanning microscope in the first embodiment of the present invention and FIG. 2 presents a map indicating the relationships among the degree of damage to the sample, the intensity of the laser light, the pinhole size and the brightness of the image.

The confocal laser scanning microscope comprises a laser light oscillation device 1, i.e., a light source, a reflector 2, a reflector 3, a microscope main unit 4, an image processing device 5, a display 6, a computer 7 and a vibration damping stage 9.

The laser light oscillation device 1 emits laser light in the deep ultraviolet range.

The microscope main unit 4 includes a light-reducing filter switching unit 11, a beam expander 14, a beam splitter 15, a two-dimensional scanner unit 16, a relay lens 17, a first objective lens 18, a first condenser lens 19, a pinhole switching unit 20 and a photomultiplier (photomultiplier tube) 21.

The light-reducing filter switching unit 11 is provided with a plurality of light-reducing filters 11a, 11b and 11c with varying light-reducing capabilities, and regulates the intensity of laser light 8 by setting one (11b in FIG. 1). of the light-reducing filters 11a, 11b and 11c on the optical path.

The beam expander 14, which is provided with a lens 14a and a lens 14b, expands the laser light 8 to a size that fills the pupil surface of the first objective lens 18.

The beam splitter 15 reflects the laser light 8 having passed through the beam expander 14 and allows laser light 8 reflected by the sample 10 to be transmitted.

The two-dimensional scanner unit 16 includes reflectors 16a and 16b and scans the laser light 8 two-dimensionally (along directions X and Y) at a constant speed.

The relay lens 17 includes a lens 17a and a lens 17b and transmits the laser light 8.

The first objective lens 18 forms spotlight 10a at the surface of the sample 10 by condensing the laser light 8.

The first condenser lens 19 allows only a focused image to pass through a pinhole to be captured at the photomultiplier 21.

The pinhole switching unit 20 is provided with a plurality of pinholes 20a, 20b and 20c in varying sizes. One (20b in FIG. 1) of the pinholes 20a, 20b and 20c can be set on the optical path. Since most of the light that is not focused at a pinhole 20 is blocked at the pinhole 20, only the focused image is observed with clarity (this is referred to as a sectioning function). Since the pinholes 20a, 20b and 20c each allow only a light flux with a width smaller than the pinhole size, they adjust the brightness of the image at the same time.

The laser light oscillator device 1, the reflector 2, the reflector 3 and the microscope main unit 4 are mounted on the vibration damping stage 9.

The vibration damping stage 9 suppresses vibration occurring at the laser light oscillator device 1 to prevent light from becoming blurred by preventing the vibration from being communicated to the microscope main unit 4. In addition, the vibration damping stage 9 also suppresses vibration originating from the outside of the microscope main unit 4 to prevent light blurring.

The photomultiplier 21 is provided to the rear of the pinhole switching unit 20. The photomultiplier 21 detects light and sequentially converts detected light to electrical signals.

The image processing device 5 is connected to the photomultiplier 21. The image processing device 5 temporarily stores the electrical signals and outputs them as electrical signals for imaging when a specific number of signals are stored.

The display 6 is connected to the image processing device 5. The display 6 converts the electrical signals to an image.

The computer 7 which is provided with a memory 7a is connected to the light-reducing filter switching unit 11, the pinhole switching unit 20, the photomultiplier 21 and the image processing device 5.

Using the map, the computer 7 judges the intensity of laser light 8 that can be irradiated in conformance to the allowable degree of damage to the sample 10 based upon a sample damage limit set by the user, drives the light-reducing filter switching unit 11 to move the light-reducing filters 11a, 11b and 11c and selects one of the pinholes 20a, 20b and 20c to be set on the optical path.

In addition, when the user sets a pinhole size A, B or C, the computer 7 drives the pinhole switching unit 20 in correspondence to the setting to move the pinholes 20a, 20b and 20c and selects one of the pinholes 20a, 20b and 20c to be set on the optical path.

If the brightness of the image obtained on the map is not within a predetermined brightness range suitable for observation, the computer 7 corrects the sensitivity of the photomultiplier 21 to adjust the brightness of the image on the display 6.

In the memory 7a, a map indicating the relationships among the degree of damage to the sample, the intensity of laser light 8 that can be irradiated, the pinholes sizes A, B or C and the brightness of the image, as shown in FIG. 2 is stored in advance.

The vertical axes include an axis 50 which represents the degree of damage, and axes 51, 52 and 53 representing the image brightness. The axes 51, 52 and 53 representing the brightness of the image respectively correspond to the pinholes 20a, 20b and 20c. The sizes of the pinholes 20a, 20b and 20c are A, B and C respectively.

When the sample 10 is an integrated circuit, for instance, the graduation scale at the axis 50 representing the degree of damage to the sample 10 indicates the degree to which the width of the resist line applied onto the integrated circuit is reduced, with 0% indicating that the resist line width remains unchanged after irradiation of the laser light 8 and 100% indicating that the resist line has completely disappeared.

The scale at the axes 51, 52 and 53 representing the image brightness indicates the digitized quantity of the average brightness at the image plane.

The horizontal axis is an axis 54 representing the intensity of the laser light 8. On the scale at this axis, 100% corresponds to the maximum output of the laser light 8 and 0% corresponds to a state in which no laser light 8 is irradiated on the sample 10.

A characteristics curve 55 is obtained in advance through testing conducted for each type of resist based upon the relationships among the degree of damage to the sample 10, the intensity of the laser light 8 and the brightness of the image.

The image brightness represents the brightness of an image achieved when the sample is irradiated with the laser light 8 at an intensity level determined in correspondence to the degree of damage to the sample 10. Thus, when the degree of damage to the sample 10 is set at a given value, the intensity of the laser light 8 is determined univocally but the brightness of the image changes depending upon which pinhole is selected. In other words, if a smaller pinholes is selected (e.g., the pinhole C), the image brightness is lowered, whereas if a larger pinhole is selected (e.g., the pinhole A), the brightness of the image achieves a larger value.

The operation of the confocal laser scanning microscope is now explained.

The laser light 8 emitted by the laser light oscillator device 1 is guided by the reflectors 2 and 3 and enters the microscope main unit 4.

The laser light 8 is adjusted to achieve a correct light quantity at the light-reducing filter 11b positioned on the optical path inside the light-reducing filter switching unit 11. Then, the laser light 8 is expanded to fill the pupil diameter of the objectives lens 18 by the beam expander 14. After the laser light 8 is reflected by the beam splitter 15, it travels through the relay lens 17 while being scanned along directions perpendicular to each other at the two-dimensional scanner unit 16, and an image is formed as a very small spot light 10a on the sample 10 by the objective lens 18. Reflected light of the small spot light 10a having been two-dimensionally scanned on the sample 10 travels backward through the objective lens 18, the relay lens 17 and the two-dimensional scanner unit 16, and becomes a stationary light beam again which is then transmitted through the beam splitter 15. Subsequently, only the light that has passed through the pinhole 20b positioned on the optical path within the pinhole switching unit 20 by the first condenser lens 19 undergoes photoelectric conversion at the photomultiplier 21. The signals resulting from the photoelectric conversion undergo image processing at the image processing device 5 and are output as image signals to be displayed on the display 6.

Next, in reference to FIGS. 1 and 2, the sequence of the operation at the computer 7 is explained.

First, the user sets a sample damage limit (the user may set, for instance, Y). At this time, the degree of damage to the sample 10 corresponding to the sample damage limit Y is Y %. As shown in FIG. 2, the intensity of the laser light 8 corresponding to the degree of damage to the sample 10 on the characteristics curve 55 is X %. Accordingly, the computer 7 drives the light-reducing filter switching unit 11, selects one of the light-reducing filters 11a, 11b and 11c so as to set the intensity of the laser light 8 to a level equal to or lower than X % and moves the selected light-reducing filter onto the optical path.

Next, the user sets one size among A, B and C representing the sizes of the pinholes 20a, 20b and 20c (the user may select, for instance, B). Accordingly, the computer 7 drives the pinhole switching unit 20 and moves the pinhole 20b onto the optical path. Since the pinhole size is B in this case, the brightness of the image is Z on the axis 52.

Subsequently, the computer 7 corrects the sensitivity of the photomultiplier 21 if the image is dark. Namely, in order to increase the brightness Z of the image in FIG. 2 to a specific brightness level suitable for observation, it raises the gain at the photomultiplier 21 and adjusts the output voltage. If, on the other hand, the brightness Z of the image in FIG. 2 is too high, it lowers the gain at the photomultiplier;21 to adjust the output voltage. It is to be noted that while the gain at the photomultiplier 21 is adjusted to adjust the image brightness in the explanation above, any of other methods may be adopted as long as the brightness of the image is adjusted.

By adopting this embodiment, a clearly defined image can be observed at the correct level of brightness in the confocal laser scanning microscope using the laser light 8 in the deep ultraviolet range as a light source and damage to the sample can be reduced.

Figure 3:
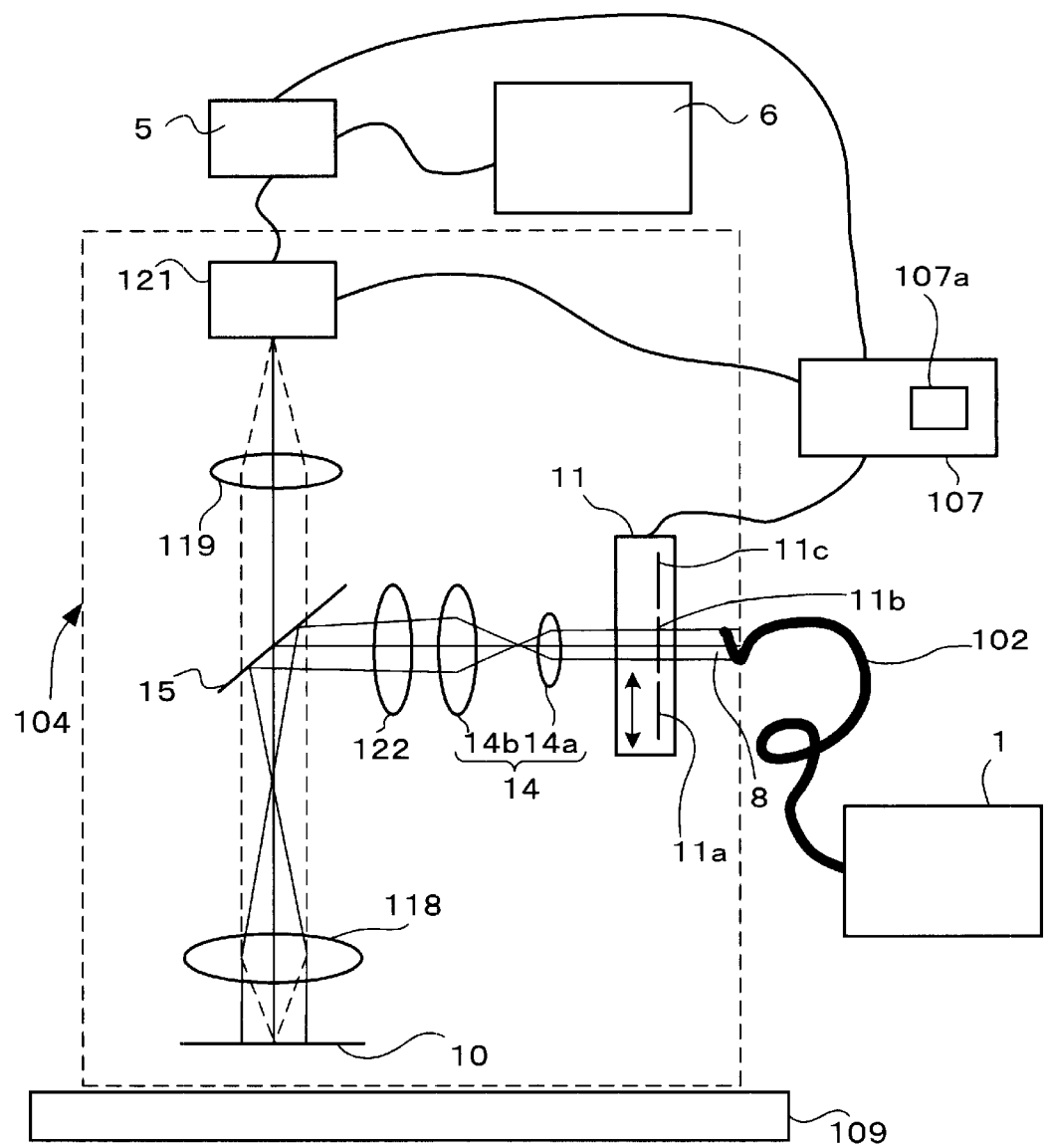
FIG. 3 is a block diagram of the laser microscope achieved in a second embodiment of the present invention.
Figure 4:
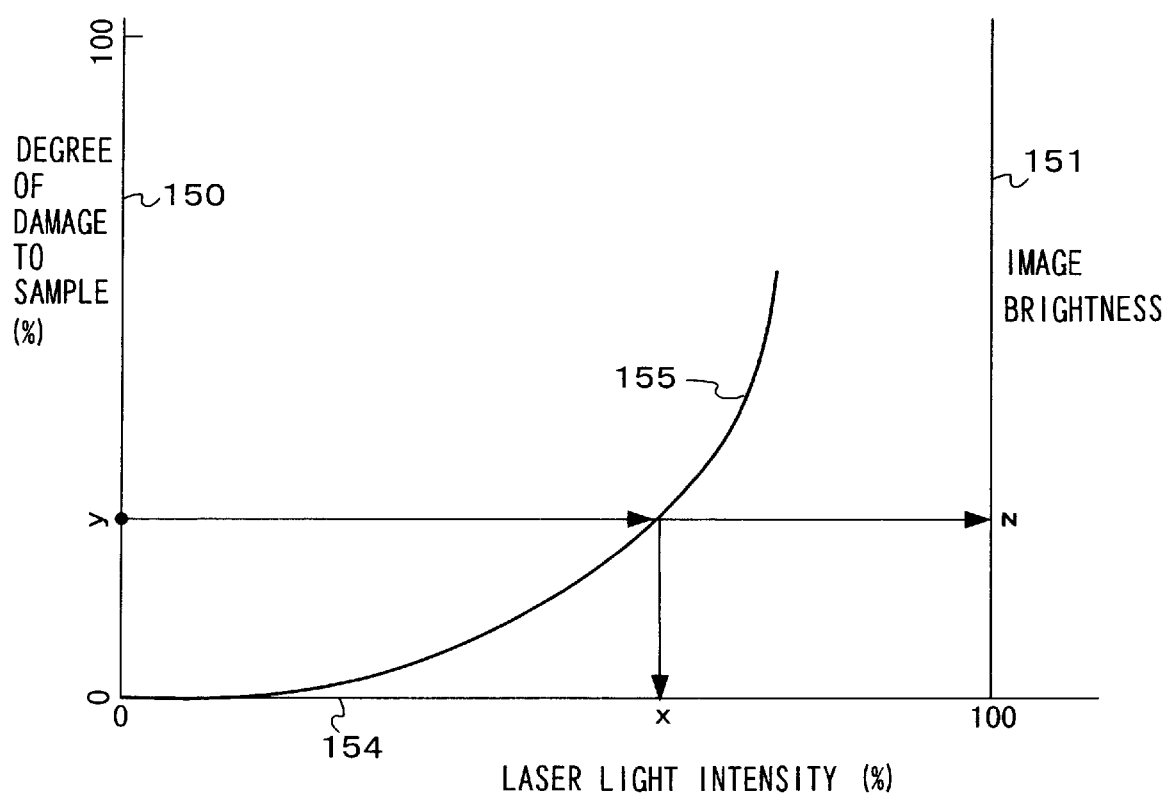
FIG. 4 presents an example of the map.

FIG. 3 is a block diagram of the laser microscope achieved in the second embodiment of the present invention and FIG. 4 presents a map indicating the relationships among the degree of damage to the sample, the intensity of the laser light and the brightness of the image. In the explanation of the embodiment, the same reference numbers are assigned to components identical to those in the first embodiment to preclude the necessary for repeated explanation.

In reference to the embodiment, a one shot illumination (Kohler illumination) type microscope is explained as an example of a laser microscope.

In the embodiment, an optical fiber 102 is provided in place of the reflector 2 and the reflector 3. A second objective lens 118 replaces the first objective lens 18 and a second condenser lens 119 replaces the first condenser lens 19. A CCD camera 121 is provided in place of the photomultiplier 21 and a computer 107 is provided in place of the computer 7. A condenser lens 122 is provided between the beam expander 14 and the beam splitter 15, with a vibration damping stage 109 provided instead of the vibration damping stage 9.

This one shot illumination (Kohehler illumination type microscope comprises a laser light oscillation device 1, i.e., a light source, the optical fiber 102, a microscope main unit 104, an image processing device 5, a display 6, the computer 107 and the vibration damping stage 109.

The microscope main unit 104 includes the light-reducing filter switching unit 11, the beam expander 14, the condenser lens 122, the beam splitter 15, the second objective lens 118, the second condenser lens 119 and the CCD camera 121.

The optical fiber 102, which may be constituted of, for instance, quartz, guides laser light 8 from the laser light oscillator device 1 into the microscope main unit 104.

The second objective lens 118 condenses the laser light 8 so as to irradiate the laser light evenly on the sample 10.

The second condenser lens 119 condenses light so as to capture an image of the sample 10 at the CCD camera 121.

The CCD camera 121 converts the captured light to electrical signals.

The image processing device 5 is connected to the CCD camera 121 with the display 6 connected to the image processing device 5.

The microscope main unit 104 is mounted on the vibration damping stage 109. The vibration damping stage 109 suppresses vibration originating from the outside of the microscope main unit 104 to prevent blurring.

The computer 107 which is provided with a memory 107a is connected to the light-reducing filter switching unit 11, the CCD camera 121 and the image processing device 5.

Using the map, the computer 107 judges the intensity of laser light 8 that can be irradiated based upon a sample damage limit set by the user. Then, one of the light-reducing filters 11a, 11b and 11c is selected to be set the optical path and the light-reducing filter switching unit 11 is driven to move the light-reducing filters 11a, 11b and 11c.

In addition, if the average brightness of the pixels deviates from the brightness of the image on the map, the computer 107 the adjusts the length of storage time at the CCD camera 121 so that the brightness of the image is adjusted from Z to a predetermined brightness level suitable for observation.

In the memory 107a, a map indicating the relationships of the intensity of the laser light 8 that can be irradiated and the image brightness to the degree of damage to the sample as shown in FIG. 4 is stored in advance.

The vertical axes include an axis 150 representing the degree of damage to the sample 10 and an axis 151 representing the image brightness.

The horizontal axis is an axis 154 representing the intensity of the laser light 8.

A characteristics curve 155 is obtained in advance through testing conducted for each type of resist based upon the relationships among the degree of damage to the sample 10, the intensity of the laser light 8 and the image brightness.

Next, the operation of the one shot illumination (Kohler illumination) microscope is explained.

The laser light 8 emitted by the laser light oscillator device 1 is guided by the optical fiber 102 and enters the microscope main unit 104.

After the laser light 8 is adjusted to achieve a correct light quantity at the light-reducing filter 11b positioned on the optical path inside the light-reducing filter switching unit 11, it is expanded by the beam expander 14 to fill the pupil diameter of the second objective lens 118, is condensed by the condenser lens 122 and is evenly irradiated on the sample 10 by the second objective lens 118 after being reflected by the beam splitter 15. The reflected light from the sample 10 travels backward through the second objective lens 118 and is transmitted through the beam splitter 15. Its image is then formed by the second condenser lens 119 in the CCD camera 121, and after undergoing photoelectric conversion, it is processed at the image processing device 5 to generate image signals which are then displayed on the display 6.

Next, the sequence of the operation at the computer is explained in reference to FIGS. 3 and 4.

First, the user sets a sample damage limit (the user may set, for instance, y). At this time, the degree of damage to the sample 10 corresponding to the sample damage limit y is y %. As shown in FIG. 4, the intensity of the laser light 8 corresponding to the degree of damage to the sample 10 on the characteristics curve 155 is x %.

Accordingly, the computer 107 drives the light-reducing filter switching unit 11, selects one of the light-reducing filters 11a, 11b and 11c so as to set the intensity of the laser light 8 to a level equal to or lower than x % and moves the selected light-reducing filter onto the optical path.

Subsequently, the computer 107 corrects the sensitivity of the CCD camera 121 if the image is too dark. It adjusts the length of storage time at the CCD camera 121 so that the brightness of the image is adjusted from Z to a predetermined brightness level suitable for observation.

By adopting this embodiment, an image at a correct brightness level can be observed on the one shot illumination (Kohler illumination) type microscope using laser light 8 in the deep ultraviolet range as a light source and damage to the sample can be reduced.

It is to be noted that while an explanation is given in reference to the embodiments on an example in which three light-reducing filters 11a, 11b and 11c with varying light-reducing capabilities are provided in the light-reducing filters switching unit 11, any number of light-reducing filters may be provided as long as there are a plurality of light-reducing filters.

In addition, similar advantages can be achieved by rotating a light-reducing filter provided within a single disk whose light reducing capability changes continuously, instead of providing individual light-reducing filters.

While an explanation is given above in reference to the first embodiment on an example in which the scanning speed of the two-dimensional scanner unit 16 is constant, maps based upon characteristics curves obtained in correspondence to a plurality of inherent scanning speeds may be stored in advance be in the memories 7a and 107a, to support different scanning speeds.

Furthermore, while an explanation is given above in reference to the first embodiment on an example in which the pinhole switching unit 20 is provided with three pinholes 20a, 20b and 20c in varying sizes, any number of pinholes other than three may be provided as long as there are a plurality of pinholes.

While the computer 7, into which the user enters a setting, engages in the adjustment of the intensity of the laser light 8, the selection of the pinhole 20a, 20b or 20c and the adjustment of the image brightness, the user may instead perform fine adjustment of the intensity of the laser light 8, selection of the pinhole 20a, 20b or 20c and fine adjustment of the image brightness through manual operation.

While the computer 107 into which the user enters a setting, engages in the adjustment of the intensity of the laser light 8,. and the adjustment of the image brightness, the user may instead perform fine adjustment of the intensity of the laser light 8 and fine adjustment of the image brightness through manual operation.

Moreover, while an explanation is given above in reference to the second embodiment on an example in which the optical fiber 102 is employed as a means for guiding the laser light 8 from the laser light oscillator device 1 to the microscope main unit 104, an optical fiber bundle may be used instead for this purpose.

What is claimed is:

1. A laser microscope, comprising:
   a light source that emits deep ultraviolet laser light to be irradiated on a sample related to a semiconductor;
   a limiting device that sets a limit to an intensity of the deep ultraviolet laser light irradiated on the sample;
   a detection device that detects the deep ultraviolet laser light having been reflected from the sample;
   a storage device that stores first information related to damage to the sample corresponding to the intensity of the deep ultraviolet laser light; and
   a control device that control said limiting device based upon said first information when a sample damage limit is input from outside; wherein
   said first information comprises a map indicating a relationship between a degree of damage to the sample and the intensity of the deep ultraviolet laser light; and
   said control device controls said limiting device based upon said map.

2. A laser microscope according to claim 1, wherein:
   said limiting device comprises a plurality of light-reducing filters with varying light-reducing capabilities to reduce the intensity of the deep ultraviolet laser light; and
   said control device selects one of said plurality of light-reducing filters based upon said map.

3. A laser microscope, comprising:
   a light source that emits deep ultraviolet laser light to be irradiated on a sample related to a semiconductor;
   a limiting device that sets a limit to an intensity of the deep ultraviolet laser light irradiated on the sample;
   a detection device that detects the deep ultraviolet laser light having been reflected from the sample;
   a storage device that stores first information related to damage to the sample corresponding to the intensity of the deep ultraviolet laser light; and a control device that control said limiting device based upon said first information when a sample damage limit is input from outside; wherein:
   said first information comprises a plurality of maps respectively corresponding to a plurality of types of the sample;
   one of said maps indicates a relationship between a degree of damage to one type of the sample and the intensity of the deep ultraviolet laser light; and
   said control device controls said limiting device based upon one of said maps.

4. A confocal laser scanning microscope, comprising:
a light source that emits deep ultraviolet laser light to be irradiated on a sample related to a semiconductor;
a limiting device that sets a limit to an intensity of the deep ultraviolet laser light irradiated on the sample;
a detection device that detects the deep ultraviolet laser light having been reflected from the sample;
a pinhole device provided frontward relative to said detection device and having a pinhole for limiting the reflected light;
a storage device that stores first information related to damage to the sample corresponding to the intensity of the deep ultraviolet laser light; and
a control device that controls said limiting device based upon said first information when sample damage limit is input from outside; wherein:
   said first information comprises a map indicating a relationship between a degree of damage to the sample and the intensity of the deep ultraviolet laser light; and
   said control device controls said limiting device based upon said map.

5. A confocal laser scanning microscope according to claim 4, wherein said pinhole device controls a pinhole size when a pinhole adjustment signal is input from outside.

6. A confocal laser scanning microscope according to claim 4, wherein:
   said limiting device comprises a plurality of light-reducing filters with varying light-reducing capabilities to reduce the intensity of the deep ultraviolet laser light; and
   said control device selects one of said plurality of light-reducing filters based upon said map.

7. A confocal laser scanning microscope, comprising:
a light source that emits deep ultraviolet laser light to be irradiated on a sample related to a semiconductor;
a limiting device that sets a limit to an intensity of the deep ultraviolet laser light irradiated on the sample;
a detection device that detects the deep ultraviolet laser light having been reflected from the sample;
a pinhole device provided frontward relative to said detection device and having a pinhole for limiting the reflected light;
a storage device that stores first information related to damage to the sample corresponding to the intensity of the deep ultraviolet laser light; and
a control device that controls said limiting device based upon said first information when sample damage limit is input from outside; wherein:
   said first information comprises a plurality of maps respectively corresponding to a plurality of types of the sample;
   one of said maps indicates a relationship between a degree of damage to one type of the sample and the intensity of the deep ultraviolet laser light; and
   said control device controls said limiting device based upon one of said maps.

* * * * *